(12) United States Patent
Krumpiegl et al.

(10) Patent No.: US 6,440,490 B2
(45) Date of Patent: Aug. 27, 2002

(54) METHOD OF PROVIDING THE SURFACE OF BASE BODIES OF DISPLACEMENT OR ANGLE MEASURING SYSTEMS WITH MAGNETIZABLE MATERIAL

(75) Inventors: Thilo Krumpiegl, Nuremberg; Andreas Kuhn, Erlangen, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/881,381

(22) Filed: Jun. 14, 2001

(30) Foreign Application Priority Data

Jun. 14, 2000 (DE) .......................... 100 29 258

(51) Int. Cl.[7] ................................ B05D 5/12
(52) U.S. Cl. .................... 427/129; 427/8; 427/128; 427/130; 427/131; 427/132; 427/190; 427/191; 427/201; 427/295; 427/299; 427/383.1

(58) Field of Search ............................. 427/8, 128, 129, 427/130, 131, 132, 190, 191, 201, 295, 299, 383.1

(56) References Cited

U.S. PATENT DOCUMENTS 5,391,403 A    2/1995    Kawado et al.

Primary Examiner—Bernard Pianalto
(74) Attorney, Agent, or Firm—BakerBotts LLP

(57) ABSTRACT

A method for providing the surface of base bodies of displacement or angle measuring systems with magnetizable material. Hard ferrite powder or materials comprising rare earths are preferred components of the magnetizable coating material. The composition of the material is changed during application of the coating such that the percentage of the ferrite or rare earth compound is increased.

11 Claims, 1 Drawing Sheet

METHOD OF PROVIDING THE SURFACE OF BASE BODIES OF DISPLACEMENT OR ANGLE MEASURING SYSTEMS WITH MAGNETIZABLE MATERIAL

BACKGROUND OF THE INVENTION

The invention relates to a method of providing the surface of base bodies of displacement or angle measuring systems with magnetizable material.

Until now, the respective magnetic tracks for displacement or angle measuring systems with magnetic graduation were realized by placing magnetizable rings on a base body, which could have consisted of steel for example. However, it is problematical in this case that, at very high rotational speeds, there is the risk of the rings becoming detached from the base body. In the technical field of protective coatings, there is also a known method of thermal spraying in which protective coatings are applied to base bodies by material particles, usually in the form of powder, being applied to substrates under a thermal influencing effect. Furthermore, it is also known from U.S. Pat. No. 5,391,403 to apply magnetizable material in this way to sensors for displacement measuring systems.

It is an object of the present invention to develop a method of the type identified at the outset of this application in such a way that the base bodies of measuring systems provided with magnetizable material are immune to detachment of the magnetizable material even under strong influencing effects, such as occur in particular at very high rotational speeds for angle measuring systems. This object is achieved by using a magnetizably material coating comprising a mixture of ferrite or materials comprising rare earths and a metallic component, whereby the composition of the magnetizable material is changed continuously from the beginning to the end of the spray application in such a way that the proportion of ferrite or of the materials comprising rare earths is chosen to increase from the beginning to the end of the spray application.

In a preferred embodiment of the invention the coating is applied in conjunction with a uniform rotating motion of the base body. As a result, a uniform coating with the magnetizable material is achieved and further the depth of the layer thickness can be achieved with precision.

A further preferred embodiment of the invention contemplates the magnetizable material being sprayed on in the form of a powder in a grain size of 1–100 $\mu$m. It has been found that in this case an extremely good bonding of the sprayed-on magnetizable material with the surface of the base body, and also of the magnetizable material with itself, is made possible. If the spraying of the magnetizable coating material occurs under a vacuum, this effect is further enhanced, since no impurities from the atmosphere impair the bonding between the magnetizable material and the base body.

An additionally very advantageous feature of the invention involves roughening the surface of the base body before the coating is applied. This increases still further the adhesive strength of the magnetizable material on the base body.

Yet another advantageous feature of the invention is that after applying the coating to a base body, the coated base body is subjected to a heat treatment. This causes the magnetizable material to be transformed from an amorphous structure to a crystalline structure. Such a recrystallization annealing improves the preconditions for later magnetization which may be enhanced if need be by simultaneously applying an external magnetic field.

The surface of the base body coated with the magnetizable material is advantageously brought to a desired size by grinding, since this avoids damaging the applied surface layer, as can occur with other working methods, for example turning.

A further advantageous feature of the invention is that a number of magnetic tracks, required according to a particular use can be impressed into the coated base body. In this way the number of desired magnetic tracks does not have to be fixed until directly before use of the coated base body.

A particularly advantageous technical use for the invention is for the base body to be in the form of a coated steel hub for use as a measuring wheel in a magnetoresistive rotary transducer system.

BRIEF DESCRIPTION OF THE DRAWING

An exemplary embodiment of the invention is explained in detail below and illustrated in the drawings of which:

In FIG. 1, the application of magnetizable material M to a base body GK is represented in the form of a basic diagram. The base body GK may in this case be assumed to be a steel cylinder, which is rotated about an axis, indicated by a cross, in the direction of an arcuate arrow. The magnetizable material M, which for example comprises a powder in a grain size between 1 and 100 $\mu$m, is applied, as indicated by an arrow, to the base body GK with the aid of devices at high temperature $\theta$, not represented for the sake of overall clarity. The temperature conditions are chosen in this case such that the possibly preheated base body GK and the preheated magnetizable pulverized material M lead to an adhering homogeneous layer on the base body GK when the stream of material impinges on the base body GK. For this purpose, it may be advantageous for the base body GK to have a pre-roughened surface. The application of the magnetizable material M may in this case take place in the natural atmosphere or in an inert-gas atmosphere, but it is also possible to carry out this procedure in a vacuum, the latter leading to particularly desirable results.

The magnetizable material M principally comprises ferrites or materials comprising rare earths with magnetic properties, and metallic additives, which may be in the form of pure metals or a metal alloys and which are of significance in obtaining a load-bearing homogeneous surface layer. In the interests of good bonding of the magnetizable material M with the base body GK, the thermal spraying can take place in such a way that, for example, the proportion of ferrite F in the magnetizable material M is initially kept relatively small at the beginning of the application and which is thereafter increased. This method produces, as it were, a concentration gradient for the ferrites in the surface layer OS.

Figure 1:
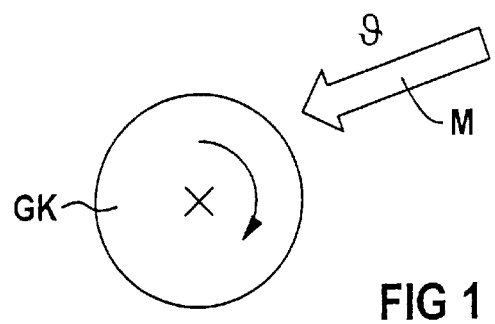
FIG. 1 shows the application of magnetizable material to a base body.
Figure 2:
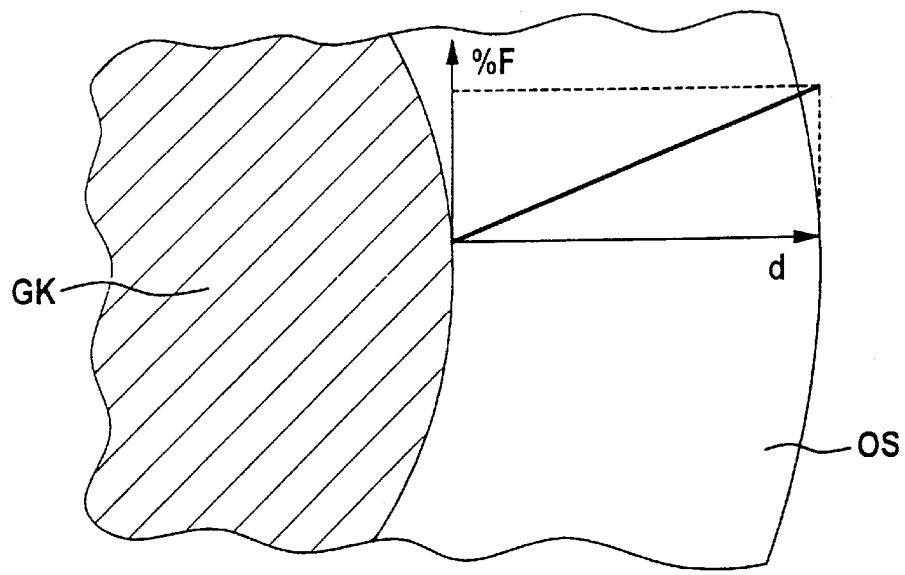
FIG. 2 shows a detail of the coated base body with the proportion of ferrite in the surface layer increasing continuously from the inside to the outside.

FIG. 2 shows an enlarged detail of part of the base body GK with the applied surface layer OS, in which the concentration gradient mentioned above is indicated in the form of a two-dimensional system of coordinates by way of example by a profile with a linear rise in the proportion of ferrite F in percent, depending on the thickness of the surface layer d. It goes without saying that other profiles with a continuous rise of the proportion of ferrite F (e.g. log, $x^2$, etc.) are also possible.

Figure 3:
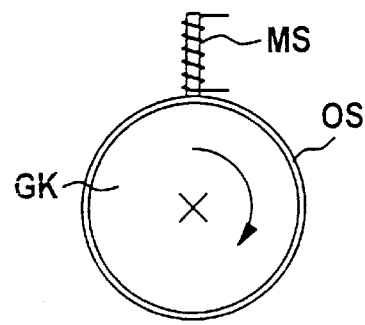
FIG. 3 shows the magnetization of the coated base body.

In FIG. 3, the finished surface layer OS is assumed to be already present on the base body GK. With a magnetic system MS shown only in a basic representation, a track configuration of magnetic tracks can then be applied to the base body GK provided with the surface layer OS when, as represented in this case, said base body is moved in a rotating manner (indicated by an arcuate arrow) about its axis (indicated by a cross). Before the application of the magnetic tracks to the base body GK already provided with the surface layer OS, the base body GK may also be subjected to a temperature treatment, to achieve homogeneous structures, e.g., recrystallization annealing. Similarly, certain magnetic pretreatments may also be undertaken in order to realize a defined preparation for the actual impression of the magnetic tracks.

The finished system comprising the base body GK and the surface layer OS, after the magnetization, may be formed as a measuring wheel for use in a rotary transducer system.

What is claimed is:

1. A method of providing at least one surface of a base body with magnetizable coating material comprising a mixture a first component selected from the group consisting of ferrite and materials comprising rare earths and a second metallic component and wherein the composition of the magnetizable coating material is changed during the application of the coating in such a way that the proportion of the first component is increased.

2. The method according to claim 1, wherein the coating is applied to a base body which is rotated at a uniform rate of speed.

3. The method according to claim 1, wherein the magnetizable coating material is sprayed on in the form of a powder.

4. The method according to claim 3, wherein the powder has a grain size of 1–100 m.

5. The method according to claim 1, wherein the coating is applied under a vacuum.

6. The method according to claim 1, wherein the surface of the base body is roughened before the coating is applied.

7. The method according to claim 1, wherein after the base body is coated, it is subjected to a heat treatment.

8. The method according to claim 1, wherein the surface of the base body coated with the magnetizable material is brought to a desired size by grinding.

9. The method according to claim 1, wherein at least one magnetic track is impressed into the coated base body.

10. The method according to claim 1, wherein the base body is for use in a displacement or angle measuring system.

11. The method according to claim 1, wherein the base body is in the form of a coated steel hub for use as a measuring wheel in a magnetoresistive transducer system.

* * * * *